July 7, 1970     R. LAMI ET AL     3,519,806

ACTUAL SLOPE COMPUTER

Filed Jan. 25, 1968     3 Sheets-Sheet 1

Inventor
Rene Lami
by:
Elvin E. Gregg

United States Patent Office 3,519,806
Patented July 7, 1970

3,519,806
ACTUAL SLOPE COMPUTER
Rene Lami and Georges Colombet, Paris, France, assignors to CSF-Compagnie Generale de Telegraphie Sans Fil, a corporation of France
Filed Jan. 25, 1968, Ser. No. 700,610
Claims priority, application France, Feb. 8, 1967, 94,150
Int. Cl. G06g 7/12; G01c 21/20
U.S. Cl. 235—150.22        7 Claims

ABSTRACT OF THE DISCLOSURE

An actual slope computing device, for indicating at any moment, in an aircraft, the deviation between the actual flight path of this aircraft and a preselected path, comprising a computing unit for computing, at any moment, the actual slope of the path of the aircraft or the altitude at which it must be to follow the preselected path and a display unit for indicating the deviation between the computed slope and the desired slope or between the computed altitude and the actual one.

---

The present invention relates to a system by means of which the pilot of an aircraft can determine, at any moment, the deviation between the actual flight path of the aircraft and the selected descent or climb path, the slope of which, i.e. the angle between the flight path and the horizontal plane, is indicated in the aircraft.

A system of this sort is particularly useful in cases when, in order to reduce noise orignating from aircraft, it is desirable for the aircraft to descend along a steeper glide path than that indicated by landing aids such as the ILS system, the glide path indicated by the ILS system being used only during the final approach. Actually, the information provided by the ILS system is often too rigid, since the glide path indicated is practically the same for all aerodromes.

Several systems have already been proposed in this respect:

Adding to the ILS system a further landing beacon which produces a steeper glide path than that otherwise given by the ILS system; however this means introducing a complication into the basic landing aids system.

Using a combination of the existing ILS system and a visual slope indicator (VASI), in which case however the degree of precision is far from good enough.

Using distance measuring equipment, the altitude being set by estimation; however this procedure is cumbersome and not very accurate.

Flying at fixed altitudes past known landmarks; however this procedure is also a cumbersome one and is not always possible.

The system according to the invention, enables a precise flight path to be followed, using only the existing systems.

According to the invention, there is provided an actual slope computing device for indicating, at any moment, on board an aircraft, the deviation between the actual flight path of said aircraft and a preselected non-horizontal path comprising: a computing unit for computing, at any moment, the value of a predetermined parameter of the position of said aircraft, necessary for said aircraft to follow said preselected path; setting means for transmitting to said computing unit the parameters characteristic of said preselected path; and indicating means connected to said computing unit for indicating said deviation.

Figure 1:
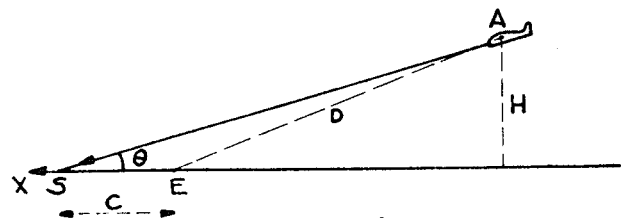
Figure 2:
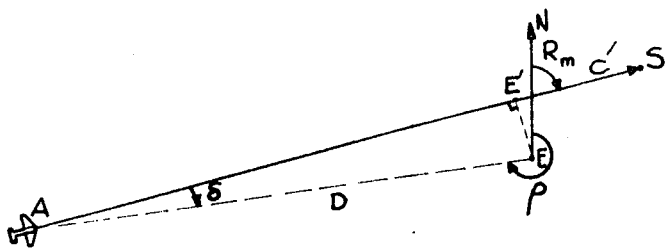
Figure 3:
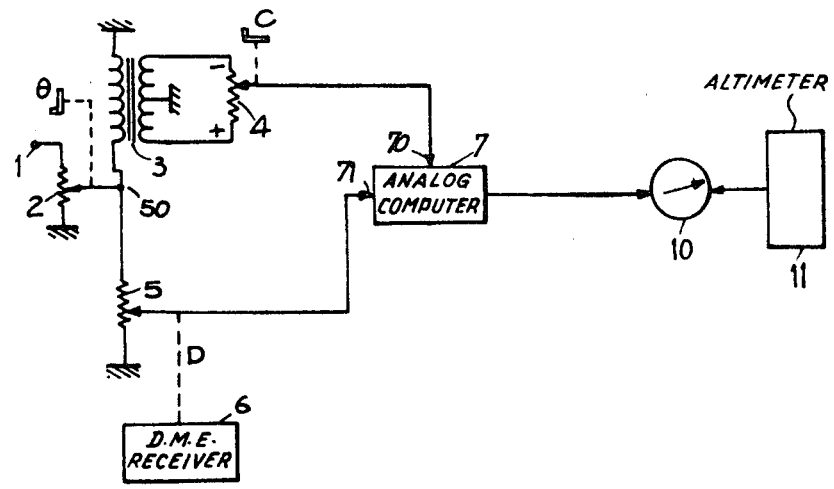
Figure 4:
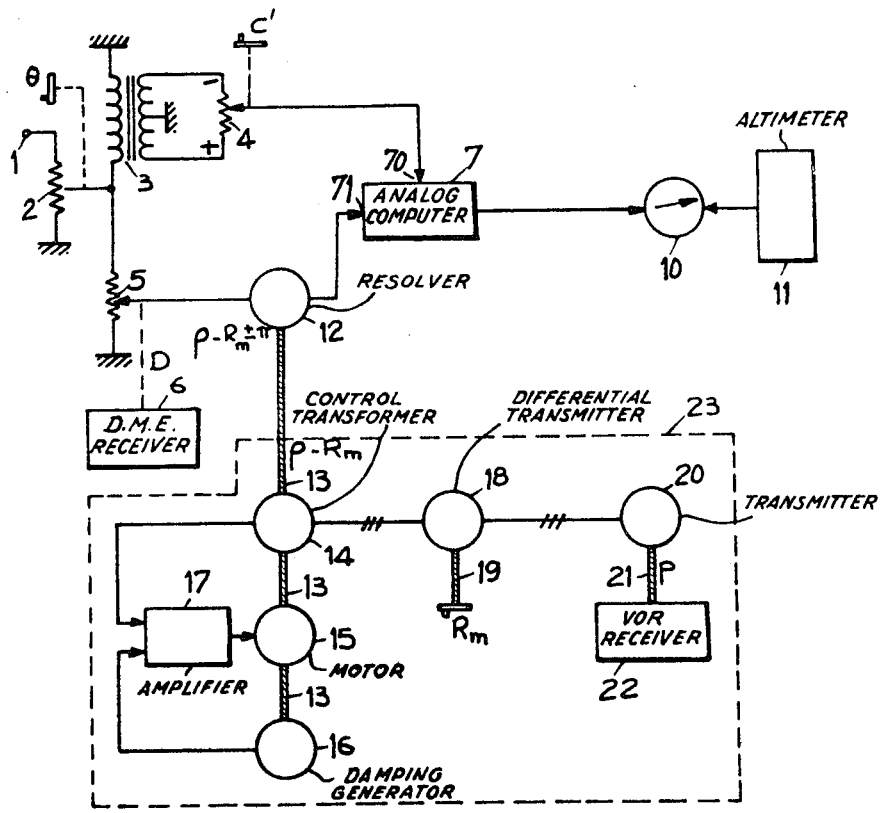
Figure 5:
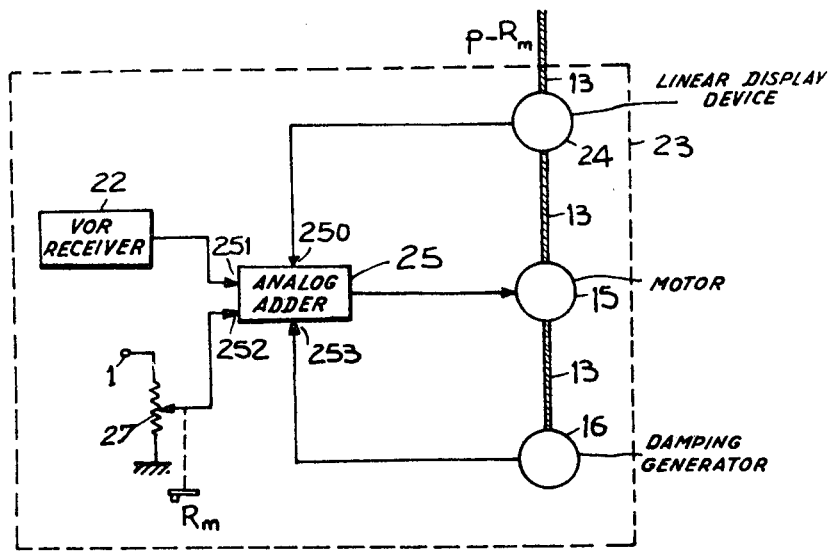
Figure 6:
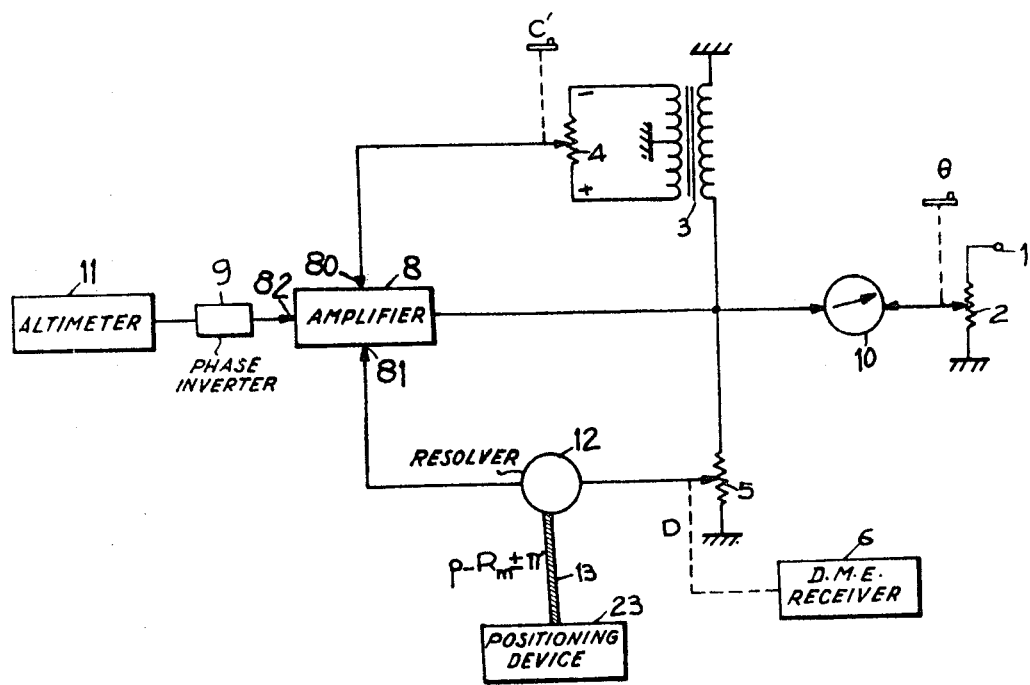

For a better understanding of the invention and to show how the same may be carried into effect reference will be made to the drawings accompanying the following description and in which:

FIGS. 1 and 2 are explanatory diagrams;
FIG. 3 is the diagram of an embodiment of a device according to the invention;
FIG. 4 is the diagram of an embodiment of the invention, considering a general case;
FIG. 5 illustrates a modification of a detail of the device shown in FIG. 4; and
FIG. 6 illustrates another embodiment of the device according to the invention, as applied to the general case.

The invention will be described in the context of the case where the equipment available consists of combined D.M.E. (distance-measuring equipment) and VOR (VHF omnidirectional range), although this is by no means limitative of the invention.

Similar reference numbers indicated similar elements in all the figures.

FIG. 1 is an explanatory projection in the vertical plane, showing the selected flight path for the simple case in which the transmitter of the D.M.E. system operates in this plane.

The ground is assumed to be flat and horizontal. It is illustrated in the figure by the axis X'X.

The assumed selected straight-line flight path of the aircraft located at A at the altitude H, is illustrated by the straight-line AS, S being the point at which this flight path intersects the ground.

The slope of the flight path is indicated by the angle $\theta$. The transmitter of the D.M.E. system is located at E in the plane of the figure. It is possible, using this equipment, to determine at any instant the distance $D=AE$ between the aircraft and the transmitter E. The algebraic value of ES will be designated by C, which is positive or negative according to whether S is behind or in front of E.

Since the slope $\theta$ is always quite moderate (in the order of 10° at the most) and the arrangement is not normally used in the final approach phase, one can write with good approximation that:

$$AS \simeq AE \pm ES = D + C$$

and                                                    (1)

$$H \simeq (D+C)\theta$$

As long as D is greater than C, this approximation is quite acceptable. During final approach, the arrangement can also be used if S in in front of E, i.e. with C negative.

However, in the general case, the transmitter E may be at a substantial distance from the vertical plane defined by FIG. 1. In this case, as illustrated in FIG. 2, one may consider a fictive transmitter E', which is the projection of E onto the vertical plane containing the selected flight path. For this purpose, the information provided by the VOR transmitter, namely the azimuthal angle $\rho$ (EN being the direction of magnetic north) is used.

One has then:

$$\delta = \rho - R_m \pm \pi$$

$R_m$ being the angle between EN and the intended path of the aircraft (aircraft course), and $$AE' = D \cos \delta$$

The Expression 1 then becomes:

$$H \simeq [D \cos (\rho - R_m \pm \pi) + C']\theta \qquad (2)$$

where $C'=E'S$ (measured on the chart).

FIG. 3 illustrates an embodiment relating to the simple ease of FIG. 1. The system according to the invention enables the calculation at any instant, for a selected flight path angle $\theta$, of the altitude H at which the aircraft should be, and also makes it possible to determine at any moment the deviation between this altitude H and the actual altitude $H_r$ of the aircraft.

The system according to the invention comprises, by way of example, an analog computer 7 and an indicator 10. It will be assumed by way of example that the computer uses alternating current.

The computer 7 has two inputs 70 and 71. The input 71 is supplied with a voltage which is the analogue of $D\theta$, by means of a potentiometer 5 whose slider displacement is controlled by the value D supplied by the D.M.E. receiver 6 already in the aircraft.

The potentiometer 5 is connected between earth and a point 50 to which a voltage is applied which is the analogue of $\theta$ and which is picked up from a setting device 2, such as a potentiometer, connected between earth and terminal 1. An A.C. reference voltage is applied to the terminal 1 and the setting device 2 is manually adjusted to indicate the selected $\theta$ value.

The voltage which is the analogue of $\theta$ is also applied to a transformer 3, the primary of which is connected between the point 50 and ground. The secondary of the transformer has a centre-tap which is earthed, and feeds a setting device 4, manually set to indicate C and connected to the input 70.

The earthed centre-tap makes it possible to set either negative or positive values of C. The output of the computer 7 is connected to a display unit 10, for example with a needle pointer or of any other type. The other terminal of the display unit is supplied with the value corresponding to the actual altitude $H_R$ of the aircraft, for example by a pressure altimeter 11 set to the aerodrome barometric pressure.

The operation of the system shown in FIG. 3 is as follows:

With the selected value of $\theta$ displayed and the flight path thus determined, the value of C as measured on the chart is manually set on the setting device 4. In addition, the potentiometer 5 is controlled in the D.M.E. receiver in order to produce, at any moment, the value of D. The computer 7 receives at its inputs 70 and 71 voltages which are the respective analogues of $C\theta$ and $D\theta$. The output voltage is the analogue of $C\theta+D\theta=H$.

The display unit 10 indicates to the pilot, at any moment, the difference between the calculated H for the aircraft to follow the selected flight path, and its actual altitude $H_R$. The display unit could also supply directly the altitude value at which the aircraft should be, enabling the pilot to take correcting action as a consequence of comparison with the aircraft altimeter.

FIG. 4 illustrates the block-diagram of the system according to the invention, for the general case. The value set on the device 4 is C' and the factor $D\theta$ must be multiplied by the correcting factor cos δ. This is effected by means of a resolver 12 whose rotor is positioned by the device 23, in the angular position $\rho-R_m\pm\pi$.

The resolver 12 then produces, as will be realized by those skilled in the art, a voltage which is proportional to the product of the input voltage (the analogue of $D\theta$) by the cosine of the angular position of its rotor. The operation of the remainder of the computer device is the same as hereinbefore described.

The positioning device 23 of the resolver 12 comprises a transmitter 20 whose shaft 21 is given the angular position $\rho$, the value of which is furnished by the receiver 22 of the VOR system.

This value $\rho$ is transmitted as voltage to a differential transmitter 18 the shaft 19 of which has its angular position $R_m$ set manually. As is well known, the differential transmitter 18 then supplies to the control transformer 14 the value $\rho-R_m$ as voltages. The control transformer 14 has a shaft 13 which is integrally connected to the shaft of a motor 15 and of a damping generator 16 in a conventional manner.

The control transformer 14 supplies an error signal proportional to the sine of the difference between the angular position of its rotor and the value $\rho-R_m$ supplied to it. This error voltage goes to an amplifier 17 to which the damping voltage is also fed. The shaft 13 thus takes up an angular position $\rho-R_m$.

The rotor of the resolver 12 is mounted on this shaft with an angular shift of $\pm\pi$. This angular shift may also be substituted by a suitable connection which reverses the sign of cos δ.

FIG. 5 shows a modification of the arrangement 23. In this embodiment an analogue adder 25 with the inputs 250, 251, 252 and 253, is used. The inputs 251 and 252 receive the respective voltages which are the analogues of $-\rho$ and $R_m$, coming respectively from the receiver 22 of the VOR system and a setting device (for example a potentiometer), connected between the terminal 1 and earth and manually controlled to be set at the value $R_m$. The input 250 is connected to a linear setting device 24 such as a potentiometer or induction potentiometer, whose shaft 13 is integral with that of a motor 15 supplied by the adder 25, and with that of a damping generator 16 connected to the input 253.

The device 24 provides a voltage which is proportional to the angular position $\varphi$ of its rotor.

The system will be balanced when the sum of the voltages at the inputs of the adder 25 is zero, i.e. for the condition $$\varphi=-(R_m-\rho)=\rho-R_m$$

The shaft 13 will then have the angular position $\rho-R_m$.

The device in accordance with the invention has, amongst other things, the advantage that it enables a flight path of constant slope to be followed, the correction for curvature of the earth being automatic since the altitude is furnished by a pressure altimeter.

Preferably, the term $R_m$ will be set manually. It is also possible to utilize the data furnished by a magnetic compass; but since it is desired to follow a predetermined flight path, it would then be necessary to introduce corrections allowing for the drift of the aircraft. On the other hand, in considering the "safe slope" case, manual setting is essential since it is necessary to set values of $\theta$ and $R_m$ which correspond to the most dangerous obstacle around the aerodrome (in the limiting case, where its distance is such that D is greater than C, because if $D+C$ is much greater than AS, the height furnished by the device in accordance with the invention will be higher than the altitude at which the aircraft actually ought to be, something which presents no danger as far as obstacles are concerned).

FIG. 6 shows the diagram of another embodiment of the system according to the invention, relating to the general case. In this embodiment, the value $\theta'$ of the slope of the flight path followed by the aircraft is calculated as a function of the actual altitude of the aircraft and compared with the desired $\theta$ value.

The operation is as follows:

An operational amplifier 8 produces at its output a voltage which is the analogue of a quantity $u$. It thus receives at its inputs 80, 81 and respectively, voltages which are the analogues of $C'u, Du \cos(\rho-R_m\pm\pi)$ and $-H$ (this being produced by a phase inverter 9 connected to the altimeter 11). Since the sum of the signals at the input of an operational amplifier is negligible, we then have:

$$C'u+Du \cos(\rho-R_m\pm\pi)-H=0$$

$u$ is thus equal to the value $\theta'$ taken from expression (2). The indicator 10 displays at any moment the deviation between the value $\theta'$ of the actual glide path slope, followed by the aircraft, and the value $\theta$ indicating the set slope adjusted on the setting device.

In the embodiments described, the utilization of an analog computer and a display unit has been considered.

Of course, these embodiments are by no means limitative of the invention and, without departing from the scope thereof, computers of another type may be used.

Also, the information concerning the flight path may be fed to an automatic pilot system.

What is claimed is:

1. An actual slope computing device for indicating, at any moment, on board an aircraft, the deviation between the actual flight path of said aircraft and a preselected non-horizontal path, comprising: a computing unit for computing, at any moment, the value of the altitude H, necessary for said aircraft to follow said preselected path; setting means for transmitting to said computing unit parameters characteristic of said paths, said setting means comprising means for setting the slope $\theta$ of said preselected path, means for setting the distance D between said aircraft and a distance-measuring transmitter, positioned in the vertical plane containing said preselected path, and means for setting the algebraic distance C, in the direction of displacement of said aircraft, between said transmitter and the intersection point of said preselected path with the ground; said computing unit comprising means for computing said altitude H according to the relation $H=(D+C)\theta$; an altimeter for supplying, at any moment, the actual altitude of said aircraft; and indicating means connected to said computing unit and to said altimeter for displaying, at any moment, the deviation between said altitude H and said actual altitude.

2. An actual slope computing device for indicating, at any moment, on board an aircraft, the deviation between the actual flight path of said aircraft and a preselected non-horizontal path, comprising: a computing unit for computing, at any moment, the value of the altitude H, necessary for said aircraft to follow said preselected path; setting means for transmitting to said computing unit parameters characteristic of said paths, and setting means comprising means for setting the slope $\theta$ of said preselected path, means for setting the distance D between said aircraft and a distance-measuring transmitter, means for setting the algebraic distnce C', in the direction of displacement of said aircraft, between the intersection of said preselected path with the ground and the projection, on the vertical plane containing said preselected path, of the position of said transmitter, and means for setting the angle $\rho - R_m \pm \pi$, $\rho$ being the azimuth of said aircraft with respect to said transmitter and $R_m$ the course of said aircraft; said computing unit comprising means for computing said altitude H according to the relation $H=[D \cos (\rho - R_m \pm \pi) + C']\theta$; an altimeter for supplying, at any moment, the actual altitude of said aircraft; and indicating means connected to said computing unit and to said altimeter for displaying, at any moment, the deviation between said altitude H and said actual altitude.

3. An actual slope computing device as claimed in claim 2, wherein said setting means comprise potentiometer means for setting said values $\theta$, D and C' and synchro means for setting said angle $\rho -_m \pm \pi$.

4. An actual slope computing device as claimed in claim 3, wherein said synchro means comprise: a transmitter having a rotor, the position of said rotor being controlled by said azimuth $\rho$; a differential transmitter connected to said transmitter and having a rotor, the position of said rotor of said differential transmitter being controlled by said course $R_m$; a control transformer connected to said differential transmitter and having a rotor mounted on a shaft; and a resolver having a rotor mounted on said shaft.

5. An actual slope computing device as claimed in claim 3, wherein said synchro means comprise; a linear setting device having a rotor; a motor for rotating a shaft, said rotor of said linear setting device being mounted on said shaft; first means for providing a voltage analog to the value $-\rho$; second means for providing a voltage analog to $R_m$; an analog adder having inputs, respectively connected to said linear setting device and to said first and second means, and an output, connected to said motor; and a resolver having a rotor mounted on said shaft.

6. An actual slope computing device for indicating, at any moment, on board an aircraft, the deviation between the actual flight path of said aircraft and a preselected non-horizontal path, comprising; a computing unit for computing, at any moment, the value of the actual slope $\theta'$ of said actual path; setting means for transmitting to said computing unit parameters characteristic respectively of said actual path and said preselected path, said setting means comprising means for setting the actual altitude H of said aircraft, means for setting the distance D between said aircraft and a distance-measuring transmitter, means for setting the algebraic distance C', in the direction of displacement of said aircraft, between the intersection of said preselected path with the ground and the projection, on the vertical plane containing said preselected path, of the position of said transmitter and means for setting the angle $\rho - R_m \pm \pi$, $\rho$ being the azimuth of said aircraft with respect to said transmitter and $R_m$ the course of said aircraft; said computing unit comprising means for computing said actual slope $\theta$ according to the relation $$\theta' = \frac{H}{D \cos (\rho - R_m \pm \pi) + C'}$$

further setting means for setting the slope $\theta$ of said preselected path; and indicating means connected to said computing unit and to said further setting means for displaying, at any moment, the deviation between said actual slope $\theta'$ and said slope $\theta$ of said preselected path.

7. An actual slope computing device as claimed in claim 6, wherein said computing unit comprises an operational amplifier.

References Cited

UNITED STATES PATENTS

| | | | |
|---|---|---|---|
| 3,165,745 | 1/1965 | Pike et al. | 343—108 |
| 3,230,507 | 1/1966 | Holt | 340—23 |
| 3,279,724 | 10/1966 | Miller | 244—77 |
| 3,309,707 | 3/1967 | Tatz et al. | 343—108 |
| 3,327,099 | 6/1967 | Nelson et al. | 235—150.22 |
| 3,355,733 | 11/1967 | Mitchell et al. | 343—7.9 |
| 3,387,302 | 6/1968 | Bevan | 343—108 |

MALCOLM A. MORRISON, Primary Examiner

R. W. WEIG, Assistant Examiner

U.S. Cl. X.R.

340—23; 343—108; 244—77